US012076592B2

(12) United States Patent
Duty

(10) Patent No.: US 12,076,592 B2
(45) Date of Patent: Sep. 3, 2024

(54) APPARATUS AND METHOD FOR A FACE MASK

(71) Applicant: Julie Anne Duty, Gilbert, AZ (US)

(72) Inventor: Julie Anne Duty, Gilbert, AZ (US)

( * ) Notice: Subject to any disclaimer, the term of this patent is extended or adjusted under 35 U.S.C. 154(b) by 534 days.

(21) Appl. No.: 17/392,097

(22) Filed: Aug. 2, 2021

(65) Prior Publication Data

US 2022/0047900 A1 Feb. 17, 2022

Related U.S. Application Data

(60) Provisional application No. 63/056,686, filed on Aug. 12, 2020.

(51) Int. Cl.

*A41D 13/11* (2006.01)
*A62B 18/02* (2006.01)
*A62B 18/08* (2006.01)

(52) U.S. Cl.

CPC ........ *A62B 18/086* (2013.01); *A41D 13/1107* (2013.01); *A62B 18/025* (2013.01)

(58) Field of Classification Search

CPC ... A62B 18/086; A62B 18/025; A62B 23/025; A41D 13/1107; A41D 13/11-1153; A41D 13/1184; A41D 13/1192

USPC .............................................................. 2/410

See application file for complete search history.

(56) References Cited

FOREIGN PATENT DOCUMENTS

KR 200446083 Y1 * 9/2009
KR 20110024310 A * 3/2011 ............ A41D 13/11

* cited by examiner

*Primary Examiner* — Samchuan C Yao
*Assistant Examiner* — Tina Zhang
(74) *Attorney, Agent, or Firm* — Inspired Idea Solutions Law Firm

(57) ABSTRACT

A method and apparatus is disclosed for constructing a mask. The mask is formed of a first mask segment overlayed on a second mask segment. The first mask segment has an article cutout on a right side. The second mask segment has an article cutout on a left side. The article cutouts extend toward a center of the mask. The mask segments are coupled together such that a passage extends between the mask segments and between the article cutouts. A user who is wearing the mask may pull either or both of the article cutouts across the center of the mask to create a hole for entrance of an article. When released, the hole may close or may enclose around an article extending through the hole.

18 Claims, 5 Drawing Sheets

APPARATUS AND METHOD FOR A FACE MASK

FIELD

The present disclosure generally relates to face masks, and more particularly to face mask permitting passage of articles therethrough.

BACKGROUND

Face masks have been around for a long time, and have been created to fulfill a variety of purposes, such as for decoration, disguise, for war, to protect, to punish, to hide or to identify. While masks have been used for some time in various medical applications, the dawn of new and problematic national and worldwide epidemics have brought the practice of mask-wearing into common use, particularly masks which either are or are perceived to reduce infection rates throughout the human population.

While the construction and composition of each mask is diverse and many, each mask or mask system comes with advantages and disadvantages, such as complexity of manufacture, comfort to the wearer, breathability, and the degree to which the mask reduces infection rates.

Therefore, a need exists to create a mask or mask system that overcomes these limitations.

SUMMARY

A mask comprises a first mask segment having an article cutout extending from a right side toward a center of the first mask segment, and a second mask segment having an article cutout extending from a left side toward a center of the second mask segment, wherein the first mask segment is positioned over the second mask segment such that the centers are in alignment, wherein the article cutouts are positioned oppositely across the centers, and wherein the first mask segment is coupled to the second mask segment to form a passage extending between the article cutouts.

A mask comprises a first mask segment formed of material having a thin cross section, the first mask segment having a top side, a bottom side, a left side, and a right side, the right side having an article cutout extending from the right side toward a center of the first mask segment, and a second mask segment formed of material having a thin cross section, the second mask segment having a top side, a bottom side, a left side, and a right side, the left side having an article cutout extending from the left side toward a center of the second mask segment, wherein the first mask segment is positioned over the second mask segment such that the top sides are in alignment, such that the bottom sides are in alignment, and such that the centers are in alignment, wherein the article cutouts are positioned oppositely across the centers, and wherein the first mask segment is coupled to the second mask segment to form a passage extending between the article cutouts.

A method of constructing a mask, the method comprising forming a first mask segment with an article cutout extending from a right side toward a center of the first mask segment, forming a second mask segment with an article cutout extending from a left side toward a center of the second mask segment, positioning the first mask segment over the second mask segment such that the centers are in alignment and the article cutouts are positioned oppositely across the centers, and coupling the first mask segment to the second mask segment such that a passage is formed between the first mask segment and the second mask segment.

BRIEF DESCRIPTION OF THE DRAWINGS

Various aspects and advantages will become apparent upon review of the following detailed description and upon reference to the drawings in which.

DETAILED DESCRIPTION

The following disclosure includes a method and apparatus for a protective face mask that creates a physical barrier between the mouth and nose of the wearer and potential contaminants in the immediate environment, and which permits passage of articles therethrough. The structure of this mask conceals an overlap of materials that, when stretched, will allow any small object (e.g., a straw or mouthpiece) to be placed inside the mask and then snugly reseal around the object that was placed inside. The mask will retain most of the aerosols emitted from the mouth and nose of the wearer into the immediate environment, as well as protecting the wearer from incoming environmental contaminants.

Figure 1B:
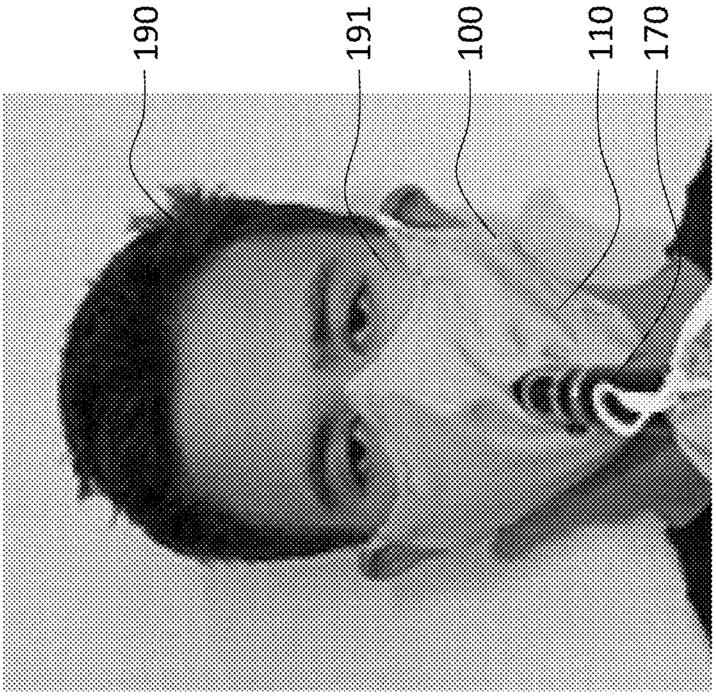
FIG. 1B illustrates a photograph of a human wearing a mask having an article passing therethrough.
Figure 1A:
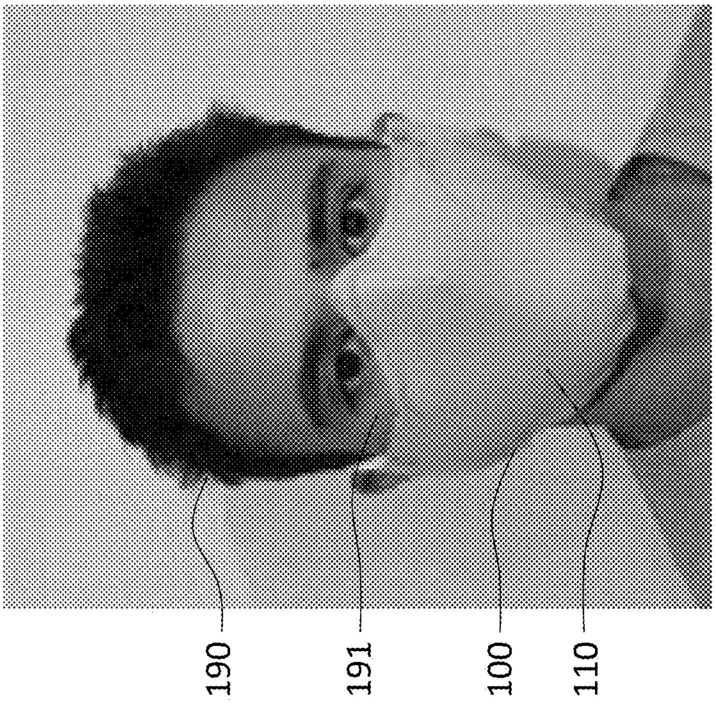
FIG. 1A illustrates a photograph of a human wearing a mask in accordance with the present disclosure.

FIGS. 1A and 1B illustrate a mask 100 positioned over the face 191 of a user 190. Mask 100 may be constructed to cover a portion of face 191. Mask 100 may be constructed to cover a mouth of user 190. Mask 100 may be constructed to cover a nose of user 190. Mask 100 may be constructed to cover eyes of user 190. Mask 100 may be constructed to cover ears of user 190. Mask 100 may be constructed to cover a mouth and nose of user 190. A person of ordinary skill in the art will appreciate that mask 100 may be constructed to cover any number of features of user 190 in order to protect user 190 from contaminants in the air (e.g., to protect the user's respiratory system) and/or to protect user 190 from other environmental conditions (e.g., to protect the user's skin).

Mask 100 may be constructed to attach to a head of user 190. Mask 100 may attach to ears of user 190 (e.g., with elastic bands). Mask 100 may attach around a neck of user 190 (e.g., with a strap having hook and loop fasteners). Mask 100 may attach around a head of user 190 (e.g., with a head harness). A person of ordinary skill in the art will appreciate that mask 100 may be constructed to attach to a head of user 190 to maximize comfort, maximize ease of installation, permit close proximity to face 191, or to seal to face 191.

Mask 100 may be formed of one or more mask segments 110 which collectively achieve the above features. Mask segments 110 may be formed of material such as fabric, hide, or composite material. The material may be natural or synthetic. The material may be woven, knitted, or otherwise formed (e.g., formed of animal hide). The material may be insulative or conductive. The material may be thin (e.g., having a thin cross section). The material may selected to have an optimum amount of stretchability. The material may selected to have an optimum amount of durability. The material may be selected to have an optimum amount of breathability. The material may be selected to optimize any one or more of the above characteristics, such as to enable mask 100 to conform to the contours of face 191, to enable breathing through mask segments 110, to enable passage of articles (e.g., article 170) through mask 100, or for other reasons presented in this disclosure.

Figure 2:
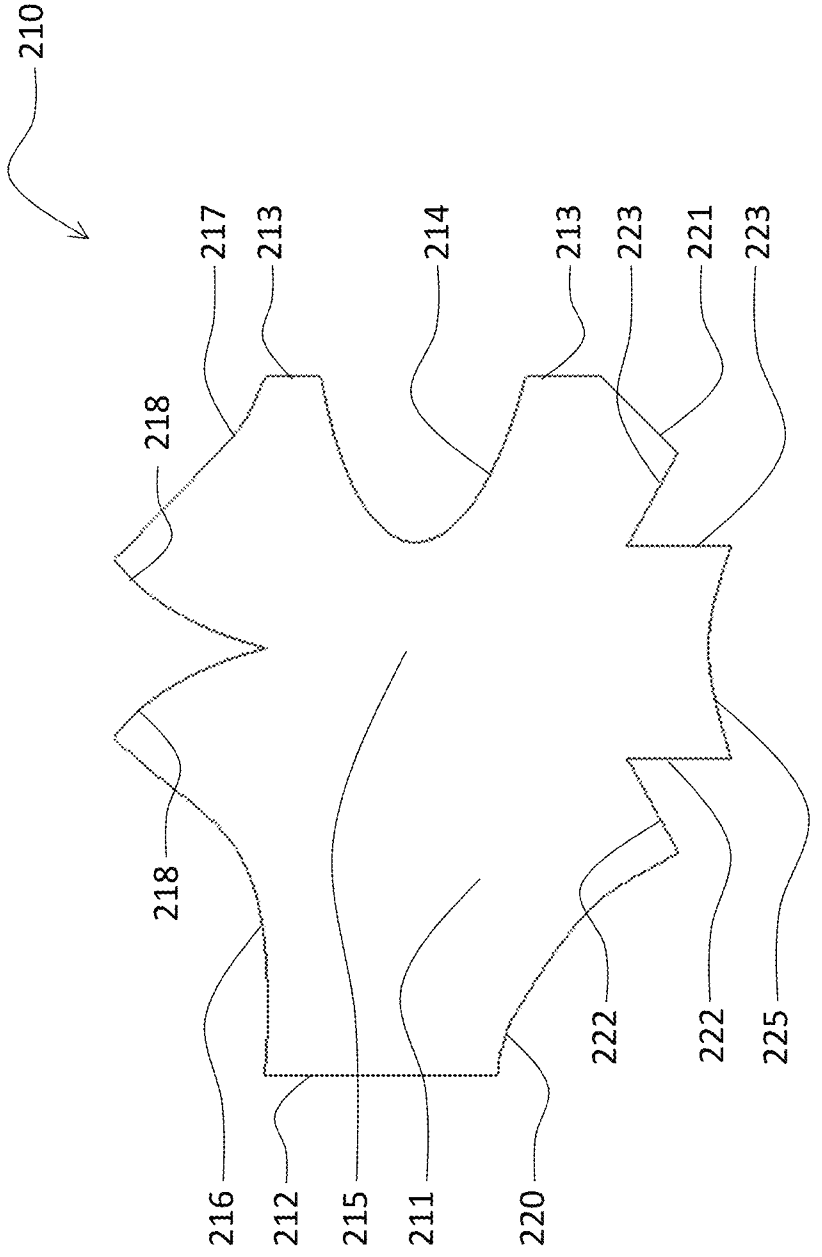
FIG. 2 illustrates a front view of a mask segment.

FIG. 2 illustrates a mask segment 210 (e.g., a left-side mask segment) of a mask (e.g., mask 100 of FIG. 1A). Mask segment 210 may be formed of any suitable material (e.g., nylon). Mask segment 210 may have a solid body 211 forming a perimeter. The perimeter may be formed of a series of cuts (e.g., cuts 212-225) in the material to form a polygonal shape. The cuts may be straight, curved, or both to optimize construction of the mask (e.g., when mask segment 210 is combined with another mask segment, or to conform to a user's face).

The perimeter may include a left side having a left side cut 212 and/or a right side having a right side cut 213. Left side cut 212 may be positioned oppositely of right side cut 213 (e.g., at opposing sides of the mask). An article cut 214 (e.g., a cutout) may extend from right side cut 213 toward left side cut 212, and may further extend back toward right side cut 213 (e.g., starting and terminating along right side cut 213, with a portion of article cut 214 extending inward, or toward a center 215 of solid body 211). While article cut 214 is illustrated with a parabolic-notched shape, this need not be the case, and other shapes may be suitable (e.g., v-notched, rectangular-notched, circular-notched, and so forth). Left side cut 212 may be further from center 215 than right side cut 213, though this need not be the case.

The perimeter may include a top side having a top left cut 216 and a top right cut 217. Top left cut 216 may extend from an upper end of left side cut 212 toward top right cut 217, and top right cut 217 may extend from an upper end of right side cut 213 toward top left cut 216. Top left cut 216 and top right cut 217 may terminate at a common peak above center 215 (e.g., no seam cuts, not shown). Top left cut 216 may terminate at a first peak, at an intersection with top seam cut 218, and top right cut 217 may terminate at a second peak, at an intersection with top seam cut 218, where top seam cut 218 extends from the first and second peaks downwardly and/or inwardly toward center 215, to a trough (e.g., forming a single v-notch, as shown, such as to extend over a nose of the user).

During manufacture of the mask, opposing sides of top seam cut 218 may be stitched together, or otherwise coupled, such that top left cut 216 and top right cut 217 terminate at a common peak. A person of ordinary skill in the art will appreciate that additional seam cuts may be incorporated (e.g., forming two v-notches, not shown) along a top side of the mask segment 210 to further facilitate fitting the mask to a user's face (e.g., face 191 of FIG. 1B), such as described in this disclosure with respect to the bottom side.

The perimeter may include a bottom side having a bottom left cut 220 and a bottom right cut 221. Bottom left cut 220 may extend from a lower end of left side cut 212 toward bottom right cut 221, and bottom right cut 221 may extend from a lower end of right side cut 213 toward bottom left cut 220. Bottom left cut 220 and bottom right cut 221 may terminate at a common peak below center 215 (e.g., no seam cuts, not shown). Bottom left cut 220 may terminate at a first peak, at an intersection with bottom left seam cut 222, and bottom right cut 221 may terminate at a second peak, at an intersection with bottom right seam cut 223. The perimeter bottom side may further include a bottom cut 225 may extend from bottom left seam cut 222 to bottom right seam cut 223. Bottom left seam cut 222 may extend from bottom left cut 220 and from bottom cut 225, respectively, upwardly and/or inwardly toward center 215, to a common trough (e.g., forming a first v-notch, as shown). Bottom right seam cut 223 may extend from bottom right cut 221 and from bottom cut 225, respectively, upwardly and/or inwardly toward center 215, to a common trough (e.g., forming a second v-notch, as shown, the first and second v-notches extending over a chin of the user).

During manufacture of the mask, opposing sides of bottom left seam cut 222 may be stitched together and opposing sides of bottom right seam cut 223 may be stitched together, or otherwise coupled. In this configuration, bottom left cut 220 and bottom cut 225 may terminate at a common peak, and bottom right cut 221 and bottom cut 225 may terminate at a common peak. A person of ordinary skill in the art will appreciate that greater or fewer seam cuts may be incorporated (e.g., forming a single v-notch, not shown) along a bottom side of the mask segment 210 to further facilitate fitting the mask to a user's face (e.g., face 191 of FIG. 1A), such as described in this disclosure with respect to the top side.

The perimeter of mask segment 210 may be formed by any one or more of the cuts described in this disclosure. A perimeter of a fully constructed mask (e.g., mask 100 of FIG. 1B) may incorporate fewer than all of the cuts described in this disclosure (e.g., omitting the seam cuts and/or omitting the article cut 214 and right side cut 213). While article cut 214 is illustrated and described as starting and terminating along right side cut 213, this need not be the case. Article cut 214 may extend from a position along right side cut 213 to a position along top right cut 217 (e.g., omitting an upper portion of right side cut 213). Article cut 214 may extend from a position along right side cut 213 to a position along bottom right cut 221 (e.g., omitting a lower portion of right side cut 213). Article cut 214 may extend from a position along top right cut 217 to a position along bottom right cut 221 (e.g., omitting right side cut 213).

The careful reader will note that while article cut 214 extends from one side of mask segment 210 (e.g., from right side cut 213 toward center 215), no corresponding cut extends from the opposing side of mask segment 210 (e.g., from left side cut 212). The precise reason for this asymmetry may be further discussed in this disclosure with respect to other figures. 218

Figures 3A, 3B:
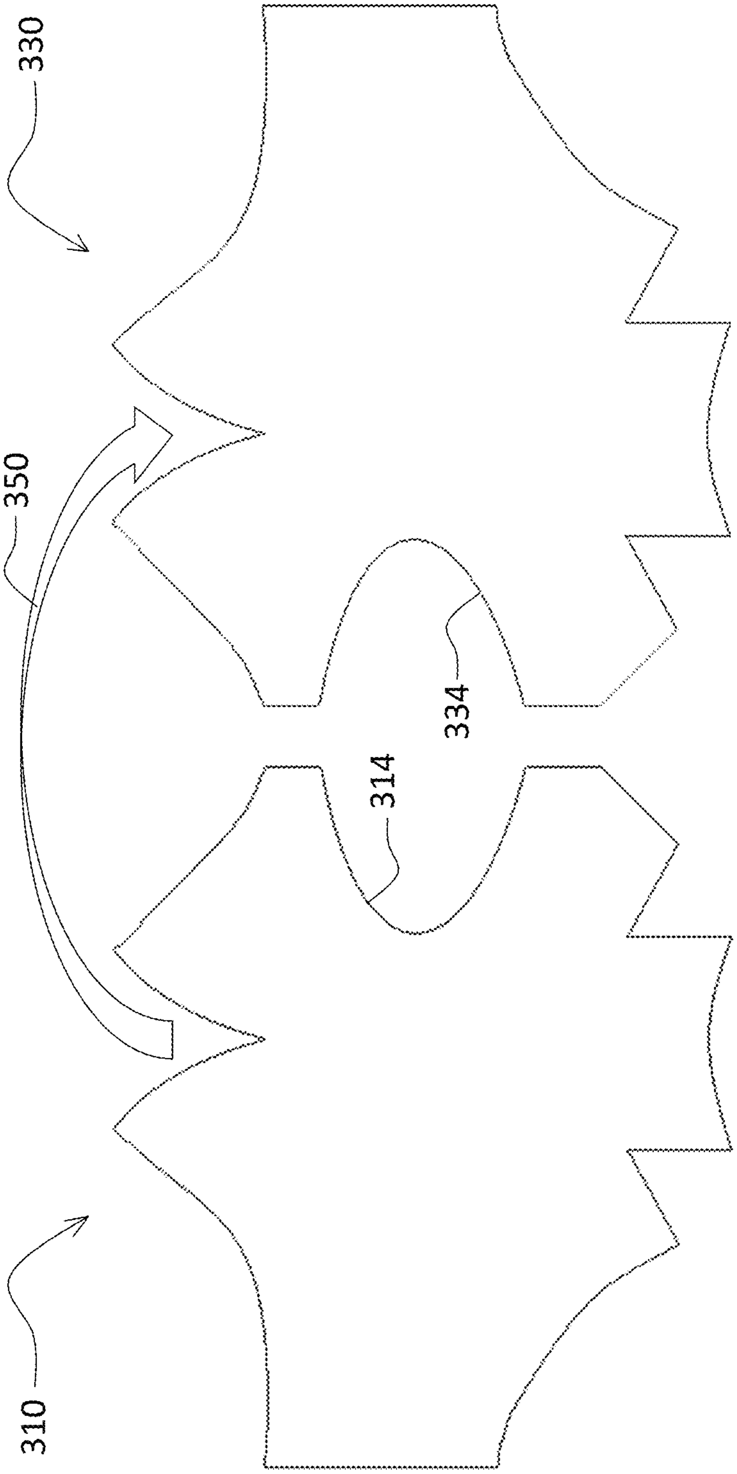
FIG. 3A illustrates a front view of a first mask segment.
FIG. 3B illustrates a front view of a second mask segment.

FIG. 3A illustrates a first mask segment 310, and FIG. 3B illustrates a second mask segment 330 (e.g., first mask segment 310 and second mask segment 330 each bearing similarity to mask segment 210 of FIG. 2). First mask segment 310 may be formed of any suitable material (e.g., polyester). Second mask segment 330 may be formed of the same material, or any other suitable material. First mask segment 310 and second mask segment 330 may each be formed of a plurality of cuts (e.g., cuts 212-225 of FIG. 2). The reader will note that second mask segment 330 is a mirror image of first mask segment 310, such that an article cut 314 (e.g., a cutout) of the first mask segment 310 may extend oppositely of an article cut 334 of the second mask segment 330.

Figure 4:
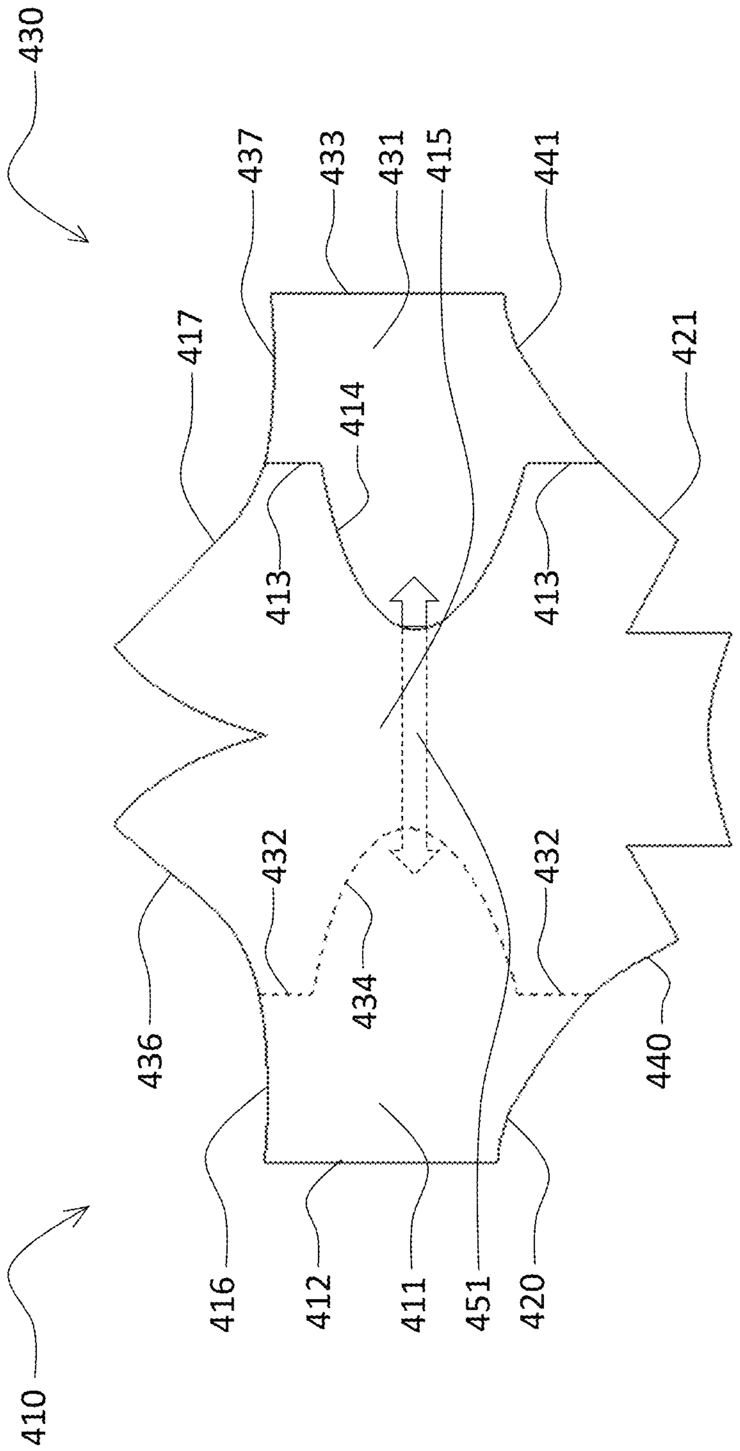
FIG. 4 illustrates a front view of a first mask segment placed over a second mask segment.

During construction, the first mask segment 310 may be placed over the second mask segment 330 (e.g., in an overlay configuration, indicated by arrow 350), such that the remaining cuts of the first mask segment 310 fall into substantial alignment with the remaining cuts of the second mask segment 330 (e.g., as illustrated in FIG. 4). A person of ordinary skill in the art will appreciate that first mask segment 310 may be placed over second mask segment 330, or second mask segment 330 may be placed over first mask segment 310.

FIG. 4 illustrates a first mask segment 410 placed over a second mask segment 430. First mask segment 410 and second mask segment 430 may be formed of a plurality of cuts, each forming a perimeter, respectively. Nevertheless, the configuration of the cuts may be such that at least some of the cuts of the first mask segment 410 fall into substantial alignment with at least some of the cuts of the second mask segment 430.

A top left cut 416 of first mask segment 410 may be in substantial alignment with a top left cut 436 of second mask segment 430. A top right cut 417 of first mask segment 410 may be in substantial alignment with a top right cut 437 of second mask segment 430. A bottom left cut 420 of first mask segment 410 may be in substantial alignment with a bottom left cut 440 of second mask segment 430. A bottom right cut 421 of first mask segment 410 may be in substantial alignment with a bottom right cut 441 of second mask segment 430. Further, one or more seam cuts of first mask segment 410 may be in substantial alignment with one or more seam cuts of second mask segment 430, and may further be stitched, or otherwise coupled, as described in this disclosure (e.g., with corresponding seam cuts of each mask segment stitched together in a single stitch, such that first mask segment 410 is stitched to second mask segment 430).

Not all cuts may be in substantial alignment. A left side cut 412 of first mask segment 410 may be in or out of alignment with a left side cut 432 of second mask segment 430. A right side cut 413 of first mask segment 410 may be in or out of alignment with a right side cut 433 of second mask segment 430. Further, an article cut 414 of first mask segment 410 may be out of alignment with an article cut 434 of second mask segment 430. Thus, article cut 414 may extend from right side cut 413 toward left side cut 412 (e.g., inwardly toward center 415, and/or toward left side cut 432), and article cut 434 may extend from left side cut 432 toward right side cut 433 (e.g., inwardly toward center 415, and/or toward right side cut 413). It is understood that the center of each mask segment may be in substantial alignment (e.g., center 415 represents the center of both the first mask segment 410 and the second mask segment 430).

Each cut of first mask segment 410 may or may not be stitched to a corresponding cut of second mask segment 430. Top left cut 416 may or may not be stitched to top left cut 436. Top right cut 417 may or may not be stitched to top right cut 437. Bottom left cut 420 may or may not be stitched to bottom left cut 440. Bottom right cut 421 may or may not be stitched to bottom right cut 441. Further, where left side cut 412 is in alignment with left side cut 432, the cuts may or may not be stitched. Where left side cut 412 is out of alignment with left side cut 432, left side cut 432 may be stitched to a body 411 of first mask segment 410. Where right side cut 413 is in alignment with right side cut 433, the cuts may or may not be stitched. Where right side cut 413 is out of alignment with right side cut 433, right side cut 413 may be stitched to a body 431 of second mask segment 430.

Thus, it may be economical to stitch, or otherwise couple, less than all the cuts of first mask segment 410 to the second mask segment 430 (e.g., such that a pocket may be formed between the first mask segment 410 and the second mask segment 430 where there is material overlap, and/or in the overlay region). Further, article cut 414 and article cut 434 may not be stitched, or otherwise coupled to the opposing mask segment (e.g., such that a passage may be formed between the first mask segment 410 and the second mask segment 430 through the area of material overlap, and/or through the overlay region, as indicated by arrow 451).

An article may be passed through the mask without compromising the other benefits of the mask. The article may be passed between the first mask segment 410 and the second mask segment 430. The article may be passed through a passage between the first mask segment 410 and the second mask segment 430. The article may be passed through the overlay region in the vicinity of article cut 414 and article cut 434. Article cut 414 of first mask segment 410 may be stretched and article cut 434 of second mask segment 430 may be stretched (e.g., toward one another to minimize the size of the passageway, and/or toward and beyond one another to create a hole through the mask).

Figure 5:
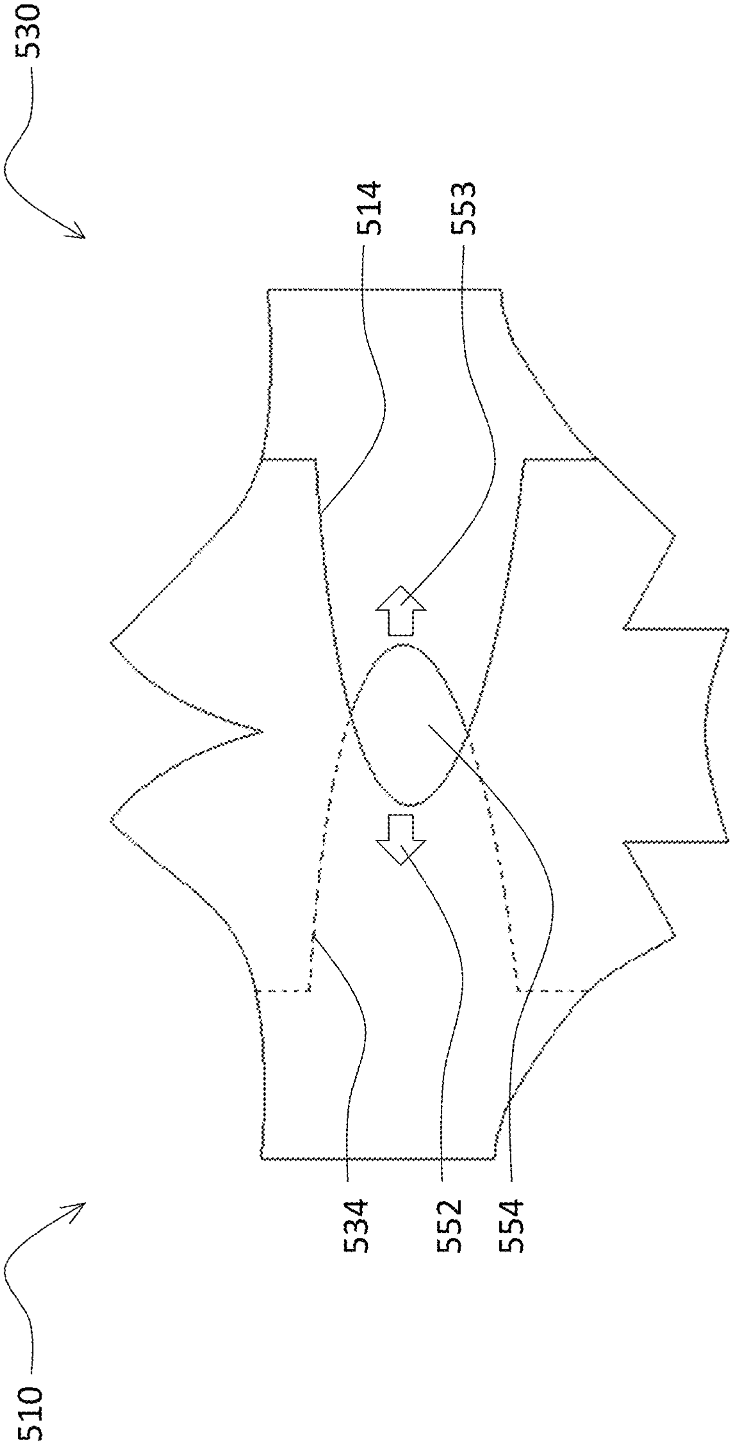
FIG. 5 illustrates a front view of a first mask segment placed over a second mask segment.

FIG. 5 illustrates a first mask segment 510 placed over a second mask segment 530. In FIG. 5, it is assumed that the mask is retained in place, such as on the face of a user (e.g., user 190 of FIG. 1A). During use, a force 552 may be applied on article cut 514 of a first mask segment 510 concurrently or non-concurrently with a force 553 which may be applied on article cut 534 of a second mask segment 530. Forces 552, 553 may be applied until article cut 514 and/or article cut 534 surpass each other, such that a hole 554 may be formed through the mask (e.g., separated in a horizontal direction). This action may be facilitated by the material properties of the mask segments, such as the stretchability of the material, the size of the article cuts, the shape of the article cuts, the proximity of the article cuts to each other prior to the application of force(s) and so forth.

Hole 554 may enable the passage of any suitable article, such as a straw (e.g., for drinking), a reed or mouthpiece of an instrument (e.g., a trombone), a breathing apparatus (e.g., an oxygen dispensing machine), a food item, or any other article that would have need to pass through the mask without removal of the mask. Thus, an article may be passed entirely through hole 554, or may pass only partially through hole 554. After partial or complete passage of the article, the forces 552, 553 may be removed. Upon removal of forces 552, 553 the stretched material may recoil back to its original position (e.g., as illustrated in FIG. 4). Upon removal of forces 552, 553 the stretched material may recoil back around any article passing only partially through hole 554. Thus, the mask may go back to use as a traditional mask, or may enclose around the article and enable use of the mask while prohibiting the escape of aerosols emitted from the mouth or nose of the user.

Stippled lines in the drawings may indicate cuts in a mask segment which fall behind the forward-most mask segment illustrated. While an exhaustive list of articles has not been presented in this disclosure, a person of ordinary skill in the art will appreciate that a host of wind instruments, straws, and other mouth-bound articles may be inserted in the user's mouth without necessitating the removal of the mask by executing the principles of this disclosure.

While the mask segments have been described and illustrated in a left- and right-side orientation, a person of ordinary skill in the art will appreciate that overlapping mask segments may be configured in a top- and bottom-side configuration, such that the corresponding article cutouts may be separated vertically, rather than horizontally. Further, the mask segments may be positioned in a left-over-right configuration, a right-over-left configuration, a top-over-bottom configuration, or a bottom-over-top configuration.

Other aspects will be apparent to those skilled in the art from consideration of the specification and practice disclosed herein. It is intended, therefore, that the specification and illustrated embodiments be considered as examples only.

What is claimed is:

1. A mask, comprising:

a first mask segment having an article cutout extending from a right side toward a center of the first mask segment; and a second mask segment having an article cutout extending from a left side toward a center of the second mask segment, wherein the first mask segment is a mirror image of the second mask segment;

wherein the first mask segment is positioned over the second mask segment such that the centers are in alignment;

wherein the article cutouts are positioned oppositely across the centers; and wherein the first mask segment is coupled to the second mask segment to form a passage extending between the article cutouts.

2. The mask of claim 1, wherein the first mask segment and the second mask segment are formed of material having a thin cross section.

3. The mask of claim 1, wherein the first mask segment has a top side, a bottom side, and a left side, and wherein the second mask segment has a top side, a bottom side, and a right side.

4. The mask of claim 3, wherein the first mask segment is positioned over the second mask segment such that the top sides are in alignment, and such that the bottom sides are in alignment.

5. The mask of claim 3, wherein the first mask segment and the second mask segment each have a seam cut forming a notch in the top side, respectively, and wherein the seam cuts are in alignment when the first mask segment is positioned over the second mask segment.

6. The mask of claim 3, wherein the first mask segment and the second mask segment each have two seam cuts forming notches in the bottom side, respectively, and wherein the seam cuts are in alignment when the first mask segment is positioned over the second mask segment.

7. The mask of claim 1, wherein the first mask segment and the second mask segment are formed of stretchable material.

8. A mask, comprising:

a first mask segment formed of material having a thin cross section, the first mask segment having a top side, a bottom side, a left side, and a right side, the right side having an article cutout extending from the right side toward a center of the first mask segment; and a second mask segment formed of material having a thin cross section, the second mask segment having a top side, a bottom side, a left side, and a right side, the left side having an article cutout extending from the left side toward a center of the second mask segment;

wherein the first mask segment is positioned over the second mask segment such that the top sides are in alignment, such that the bottom sides are in alignment, and such that the centers are in alignment;

wherein the article cutouts are positioned oppositely across the centers; and wherein the first mask segment is coupled to the second mask segment to form a passage extending between the article cutouts.

9. The mask of claim 8, wherein the first mask segment and the second mask segment each have a seam cut forming a notch in the top side, respectively, and wherein the seam cuts are in alignment when the first mask segment is positioned over the second mask segment.

10. The mask of claim 8, wherein the first mask segment and the second mask segment each have two seam cuts forming notches in the bottom side, respectively, and wherein the seam cuts are in alignment when the first mask segment is positioned over the second mask segment.

11. The mask of claim 8, wherein the first mask segment and the second mask segment are formed of stretchable material.

12. A method of constructing a mask, the method comprising:

forming a first mask segment with an article cutout extending from a right side toward a center of the first mask segment;

forming a second mask segment with an article cutout extending from a left side toward a center of the second mask segment, wherein the second mask segment is a mirror image of the first mask segment;

positioning the first mask segment over the second mask segment such that the centers are in alignment and the article cutouts are positioned oppositely across the centers; and coupling the first mask segment to the second mask segment such that a passage is formed between the first mask segment and the second mask segment.

13. The method of claim 12, wherein the first mask segment and the second mask segment are formed of material having a thin cross section.

14. The method of claim 12, wherein the first mask segment is formed with a top side, a bottom side, and a left side, and wherein the second mask segment is formed with a top side, a bottom side, and a right side.

15. The method of claim 14, wherein the first mask segment is positioned over the second mask segment such that the top sides are in alignment, and such that the bottom sides are in alignment.

16. The method of claim 14, wherein the first mask segment and the second mask segment are each formed with a seam cut forming a notch in the top side, respectively, and wherein the seam cuts are in alignment when the first mask segment is positioned over the second mask segment.

17. The method of claim 14, wherein the first mask segment and the second mask segment are each formed with two seam cuts forming notches in the bottom side, respectively, and wherein the seam cuts are in alignment when the first mask segment is positioned over the second mask segment.

18. The method of claim 12, wherein the first mask segment and the second mask segment are formed of stretchable material.

* * * * *